United States Patent Office 2,729,953
Patented Jan. 10, 1956

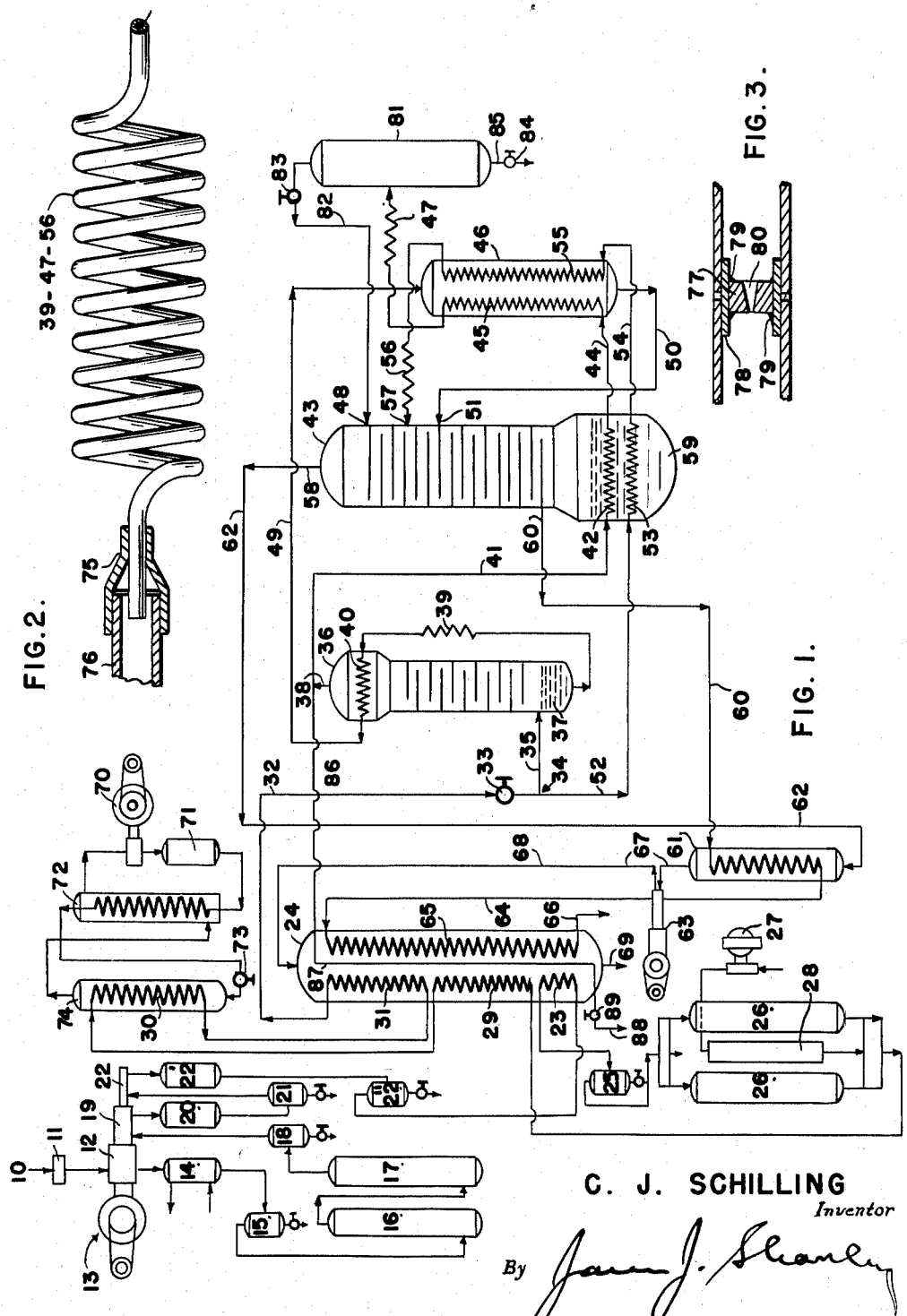

2,729,953
AIR FRACTIONATING CYCLE AND APPARATUS

Clarence J. Schilling, Allentown, Pa., assignor to Air Products Incorporated, a corporation of Michigan Original application October 9, 1946, Serial No. 702,112, now Patent No. 2,620,637, dated December 9, 1952. Divided and this application April 16, 1952, Serial No. 282,644

11 Claims. (Cl. 62—122)

This invention relates to the fractionation of air for the separation of oxygen and nitrogen in states of substantial purity.

This application is a division of application, Serial No. 702,112, filed October 9, 1946, now Patent No. 2,620,637, granted December 9, 1952 for Air Fractionating Cycle and Apparatus.

An objective of the invention is to provide an air fractionating cycle which is substantially self-regulating and which requires the minimum of operator attention.

An objective of the invention is to provide an air fractionating cycle capable of being put into operation in the minimum of time, permitting shutdowns at desired intervals without material loss of time in restarting.

An objective of the invention is to provide an air fractionating apparatus which may be assembled in a very small space for ready portability.

These and other advantages are attained by certain modifications of the conventional double column apparatus and cycle which will be described in detail with reference to the attached drawings, in which Fig. 1 is a diagram and flowsheet of the operating cycle, in which apparatus elements are indicated by conventional symbols;

Fig. 2 is a detail, in elevation of a choke coil which may be used to advantage to control the flows of various feed streams, and Fig. 3 is a detail, in section, of an orifice fitting which may be used in place of the choke coil for the same purpose.

Referring first to Fig. 1, atmospheric air enters the system at 10 through an air filter 11 and is compressed to about 65 pounds gauge in the first stage 12 of an air compressor 13. The low pressure air is brought back to atmospheric temperature in a water-cooled intercooler 14 and separated from condensed water in a trap 15. The low pressure air stream then passes through towers 16 and 17 in which it is scrubbed successively with a weak and with a strong solution of a caustic alkali for the removal of the greater part of the carbon dioxide. These towers are operated continuously, weak solution being withdrawn and strong solution transferred and replaced at intervals.

The scrubbed air, which is substantially but not entirely free from carbon dioxide, passes through a water trap 18 to the second compression stage 19, which is maintained at about 435 pounds gauge, thence through an intercooler 20 and a trap 21 to the final compression stage 22. During the starting period this stage is held at about 2500 pounds gauge, the pressure being dropped to about 1100 pounds during normal operation.

The high pressure air, still containing small quantities of water vapor and carbon dioxide, passes through a water-cooled aftercooler 22' and a water trap 22" to the first stage coil 23 of primary interchanger 24 in which its temperature is reduced to a point just above the freezing point of water, by interchange against partially warmed gaseous fractionation products, as will be described. The liquid water produced by this cooling and carried as a mist in the air stream is trapped out in any preferred form of water separator 25 and drained from the system. All of the water traps referred to are preferably provided with automatic bleeder valves not shown.

The partially dehydrated air stream next passes through one of the desiccators 26—26 in which the water content of the air is reduced to a figure which, in view of certain precautions to prevent stoppage by ice crystals, later to be described, is negligible. These desiccators, which contain contact beds of adsorbent material such as silica gel or activated alumina, are used alternately in the well known manner (cf. Ikeda, 1,541,147) one being in use while the other is being regenerated by blowing with air supplied by a motorblower 27 and heated in an element 28. The valve arrangements for these diversions are well known and are not shown.

The substantially dry air stream now returns to the primary interchanger 24 where it is further cooled to about 253° K. in the second stage coil 29. It then flows to an interchanger 30, an element in an external refrigeration cycle later to be described, in which it is cooled to about 233° K. by heat interchange with a boiling liquid refrigerant, as for example Freon 12 (dichlorodifluoromethane).

The air stream then returns to third stage coil 31 of the primary interchanger, in which it is cooled by heat interchange with column products to about 140° K., the air at this temperature and pressure being still in the gaseous phase.

The refrigerated air passes through a conduit 32 to a manually controlled expansion valve 33 by which its pressure is reduced to about 100 pounds gauge with a concommitant reduction of temperature to about 100° K. The stream then passes to a point of division 34, a portion of the stream, as for example 40 percent, flowing through conduit 35 into the base of the high pressure column 36, the remainder passing on to a low pressure column through various steps of heat interchange later described. The proportioning of the two divisions of the air stream is controlled by the balancing of flow resistances interposed in the several branches.

In the high pressure column, which may be packed or provided with bubble plates as preferred, the portion of the total air feed entering at 35 is separated by fractionation into an oxygen-rich liquid (crude oxygen), which collects in a pool 37 in the base of the column, and a vapor fraction consisting substantially of nitrogen which is delivered from the top of the column at 38.

The crude oxygen passes from pool 37 through a choke coil 39 which functions, in lieu of an expansion valve, to reduce the pressure on the stream to about 10 pounds gauge, the temperature falling to about 83° K. As this temperature is below the boiling point of nitrogen at the pressure existing in the upper end of the high pressure column, the passage of the expanded crude oxygen through coil 40, immersed in nitrogen vapor, provides by condensation a liberal supply of reflux liquid for the packing or plates below.

The gaseous nitrogen from the high pressure column passes via conduit 41 to a coil 42 immersed in a pool of liquid oxygen boiling in the base of the low pressure column 43. Condensing in this coil, it passes by way of conduit 44 to a coil 45 in secondary interchanger 46. In this coil it is cooled by heat interchange with the feed of expanded crude oxygen to the low pressure column. It is finally passed through a choke coil 47, by which its pressure is reduced to about 10 pounds gauge and its temperature to about 81° K., and is fed into the low pressure column at 48 as a liquid nitrogen stream. The entry into the column may be direct, as in conventional practice, or it may be by way of a storage tank (81) later described.

The crude oxygen issuing from coil 40 in the head of the high pressure column at about 83° K. passes via conduit 49 to the element 46 in which it is in heat interchange with the liquid nitrogen above described and with a stream of liquid air described below. In this interchange a portion of the liquid of the crude oxygen stream is vaporized, and as the pressure has already been reduced (at 39) to approximately that of the low pressure column, the partially liquid stream is passed to the column through conduit 50, entering at point 51 at about 83° K.

Returning to division point 34 on the main air feed line, the portion of the total feed remaining after the side stream is diverted through conduit 35 is carried through conduit 52 to a coil 53 immersed in boiling oxygen in the base of low pressure column 43. In this coil it is condensed at about 100° K. without material change in pressure. The air stream then passes through conduit 54 to a coil 55 in secondary interchanger 46, in which it is in heat interchange with the crude oxygen stream as above stated and in which its temperature is further reduced to about 85° K. It is then passed through a choke coil 56 by which its pressure is reduced to about 10 pounds gauge and its temperature to about 82° K. and is fed into the low pressure column at 57 in the liquid condition.

The low pressure column may be provided with the conventional bubble plates or with packing, as may be preferred. This column completes the fractionation of the air, delivering nitrogen in gaseous form at 58 and collecting commercially pure oxygen (about 99.5%) in a pool 59 in the base of the column. This oxygen product may be withdrawn in liquid form from the pool but I prefer to withdraw it as a liquid stream from the lowermost plate in the column.

The liquid oxygen stream passes through conduit 60 to an interchanger 61 in which it is cooled to a temperature at least several degrees below its boiling point at the existing pressure, in heat interchange with the entire stream of gaseous nitrogen flowing from the low pressure column through conduit 62. The refrigerated and stabilized stream of oxygen enters a pump 63 by which it is discharged through conduit 64 to a coil 65 in the primary interchanger 24, in which it is in counterflow to the entering compressed air feed. In this coil the liquid oxygen is vaporized and brought back substantially to atmospheric temperature, and is discharged at 66, at any required pressure, into gas bottles or pipe lines.

The stream of nitrogen leaving interchanger 61 through conduit 67 is passed through a cooling jacket (not shown) surrounding the cylinder of pump 63, in which it functions to prevent gas locking in the manner described in the copending application of Carl R. Anderson entitled "Pump for Liquefied Gases," filed October 21, 1943 under Serial No. 507,091, now Patent No. 2,439,957. From this jacket it passes through conduit 68 to the primary interchanger 24 in which it is in counterflow to the air feed streams in coils 23, 29 and 31, and is discharged at 69 as a gas at substantially atmospheric temperature and pressure.

In the design of the plant above described, the pressure drops across choke coils 39 and 47, located respectively in the crude oxygen and liquid nitrogen feeds to the low pressure column, are so balanced against the pressure drop across choke coil 56, located in the liquid air feed to the low pressure column, that the total air feed is divided between the two columns in the desired proportion. Once established, this relation is thereafter maintained through varied regulation of the primary expansion valve 33 by which the pressure at division point 34 is controlled. As the choke coil itself is an element of small size and low cost it may readily be replaced by another of different flow resistance if it becomes desirable to alter the proportions fed to the two columns. The coils, later described, are simple helices of smooth walled, metallic tubing, the flow resistance of which for any given volume and weight of fluid may readily be calculated and checked experimentally.

The external refrigerating cycle above referred to as cooling the air feed stream taken from interchange coil 29 consists essentially of a compressor 70, a water-cooled liquefying interchanger 71, a subcooling unit 72 in which the water-condensed liquid is in interchange with vapor from the evaporator, an expansion valve or choke coil 73 and an interchanging evaporator 74 containing the air-cooling coils 30. The vapor of Freon (the preferred cooling medium) is compressed to about 110 pounds gauge, liquefied, subcooled and expanded to about 480 mm. absolute in the evaporator, the vapor produced by interchange with air being used to subcool the water-condensed liquid. This pressure relation produces a temperature in the bath of boiling Freon of about 233° K.

Other refrigerating liquids of suitable high boiling points, such as ammonia or sulfur dioxide, may be substituted, but the use of Freon is advantageous by reason of its high molecular weight and correspondingly high heat carrying capacity, permitting the use of a relatively small unit for any given refrigerating effect.

Referring now to Fig. 2, the choke coils indicated at 39, 47 and 56 may be helices of, for example, half hard seamless copper tubing, of such internal diameter and such length as to transmit the desired quantity of fluid with the desired drop in pressure.

The proportioning of these coils is not critical but they should be sufficiently heavy to avoid risk of flattening the tubing in winding on a mandrel: for example, the internal diameter may be more or less than one-half of the external diameter. The pitch of the turns is unimportant but may conveniently be about twice the tube diameter. The length of the coil and its most desirable internal diameter will vary widely with the quantities and pressures involved and must be calculated for any specific case. It is highly desirable, however, to choose a bore sufficiently great to call for at least several feet of tubing to provide the necessary flow resistance.

The ends of the coil may be connected into the conduit which they control by the use of tubing fittings but it is preferable to use the reducing fitting shown at 75 in Fig. 2, in which 76 is a fragment of the conduit. The large end of the reducer is placed over the end of the conduit, the end of the coil is inserted in the small end of the reducer and run into the end of the conduit, and both ends may then be soldered without danger of solder entering the bore of the choke coil. This type of connection is readily broken by melting the solder at the large end of the fitting.

The use of a choke coil in an apparatus and cycle of the type described has important advantages over the use of the conventional needle type valve, whether the stream be liquid, gaseous or in mixed phase.

The primary advantage is the constancy of proportioning of the two divisions of the air stream, this, however, being an advantage shared with other types of fixed orifice. The second, which also is shared with the fixed orifice illustrated in Fig. 3, is that a circular orifice of any given effective area has a far greater minimum dimension than the annular opening between the needle and the seat in the conventional expansion valve, thus reducing the liability to stoppage by entrained solids.

The major advantage, which is particular to the coil type of orifice, is that as the flow path is highly extended (ordinarily 1000 or more times the diameter of the opening) the latter may have a much greater cross sectional area, for any given duty, than is possible where the opening is formed in a plate or button and is of an immaterial length.

Thus the coil type of choke has proven to be a complete insurance against stoppage by ice and carbon dioxide crystals, to which expansion valves are highly subject and which requires such valves to be manipulated at frequent intervals to maintain their regulation. The short orifice, though far preferable to the valve, is still somewhat subject to choking, particularly in very small sizes.

If the size of the apparatus be such as to call for relatively large flow-regulating openings, it is permissible to substitute for the choke coil a simple orifice, such as illustrated in Fig. 3. This fitting may be in the form of a button or plate 77 of hard metal retained in a copper collar 78 by fillets 79 of hard solder or brass. The actual orifice 80 should be tapered at least several degrees and in placing the fitting the larger end should be directed downstream.

It is often desirable to provide a source of supply of pure nitrogen, either liquid or gaseous, in an apparatus of this type the primary purpose of which is to supply pure oxygen. In such cases, instead of delivering the liquid nitrogen from choke coil 47 directly into the low pressure column, as is customary, it is delivered into a reservoir 81 which fills with the liquid and overflows through a conduit 82 and a valve 83 into the column at 48.

Liquid nitrogen may be withdrawn from this reservoir through a drain pipe 85 having a control valve 84, the upper valve 83 being throttled down if any back pressure is to be overcome.

To obtain pure nitrogen in gaseous form from the high pressure column, a branch 86 from the high pressure nitrogen vent 38 is provided, this branch communicating with a conduit 87 within interchanger 24 and in heat interchange with the entering air supply. This conduit is provided with a vent 88 controlled by a valve 89 through which gaseous nitrogen at atmospheric temperature and at any pressure up to that of the high pressure column may be withdrawn.

As soon as the operation comes into balance after either of the valve manipulations above described, nitrogen and oxygen, each at about 99.5% purity, may be withdrawn from the system simultaneously, with some reduction of the normal oxygen output due to the reduced quantity of reflux liquid available for the low pressure column.

In the preferred embodiment, element 36 has been shown as a gas-liquid contact column although, obviously, any suitable structure for fractionating a gaseous mixture by liquefying a portion may be used.

The cycle above described, while including several conventional steps, differs from both the single column and the double column operations of the prior art in important particulars.

It resembles the single column in simplicity and in having but a single manual valve, but differs from it in producing considerably more oxygen of high purity than can be obtained from a single column of equal dimensions.

It differs from double column operation in taking only part of the total air feed through the high pressure stage, thus materially reducing the dimensions of this element of the apparatus.

It differs from conventional double column operation in producing the liquid nitrogen required for refluxing the high pressure column by interchange with expanded crude oxygen rather than with the pure oxygen boiling in the low pressure column. This makes possible the thermal and the physical separation of the columns, which, in turn, reduces the height of the apparatus and makes for a very compact assembly.

It differs from both of the conventional types in having three liquid feeds to the low pressure column, whereas the double column has two and the single column but one. As these feeds are of widely different compositions and are at controllable temperatures it is possible to introduce each at its equilibrium level in the column and to produce the optimum temperature gradient and the optimum relation between liquor and vapor throughout the length of the column.

It differs from conventional operations in bringing to the single manually operated expansion valve a highly refrigerated air stream in the wholly gaseous state, avoiding the difficulties incident to regulating a manual valve handling liquid or partly liquefied air, as well as the risk of choking.

It differs from the conventional two stage operation in using flow resistances of fixed values in place of expansion valves in reducing the products of the higher pressure stage to the lower pressure, thereby avoiding the fluctuations in operating conditions, incident to manual control of these flows and the risk of stoppages incident to the use of valves at these locations.

The use of the auxiliary (Freon) refrigerating cycle assists in quick starting, compensates the losses of refrigeration incident to adsorption of water from a partially refrigerated air feed and permits the water adsorption step to be conducted at the low temperature at which it is most effective.

It will be understood that the temperatures and pressures recited herein are intended solely to be illustrative of preferred operating conditions and that they are not limiting. The major advantages of the invention are retained even though these conditions be departed from rather widely. It will also be understood that certain of the steps above recited may advantageously be used in combinations other than those in which they are used herein.

I claim:

1. In an air fractionating apparatus having fractionating columns arranged to operate respectively at relatively high and relatively low pressure: means for liquefying at the higher pressure a stream of gaseous nitrogen drawn from the high pressure column; means for expanding to the lower pressure a stream of crude oxygen drawn from the high pressure column; means for subcooling said liquid nitrogen stream by heat interchange with said expanded crude oxygen stream; means for expanding said subcooled nitrogen to the lower pressure; transfer means including a path through a liquid receiving reservoir communicating with the last-named expansion means and the low pressure column for delivering expanded subcooled nitrogen to the low pressure column, and valve controlled means for withdrawing desired quantities of liquid nitrogen from said reservoir.

2. Apparatus for fractionating a mixture of gases comprising means for expanding a stream of compressed and refrigerated gaseous mixture, means for dividing the expanded stream of compressed and refrigerated gaseous mixture into two substreams, first gas-liquid separation means for separating one substream to produce two product streams, fractionating means, separate conduit means for conducting each of the two product streams and the second substream to the fractionating means, a flow resistance of fixed and predetermined value interposed in each of the separate conduit means, the respective values of the flow resistances being so proportioned as to produce a desired volumetric relationship between the two substreams.

3. Apparatus as described in claim 2, in which each flow resistance is an orifice in elongated tubular form and of relatively small bore.

4. In the separation of gaseous mixtures including a relatively high boiling constituent as an impurity, in which a compressed and refrigerated stream of the gaseous mixture in vaporous form is fractionated into a liquid product and a gaseous product, the steps comprising reducing the pressure of the stream of the compressed and refrigerated gaseous mixture by a controlled amount so as not to deposit substantial impurity out of the mixture during such pressure reduction, then liquefying a stream of the mixture and depositing out impurity in solid form, expanding a stream of liquefied mixture by restricting a portion of the stream of liquefied mixture to a minimum diameter greater than the largest particles of solid impurity, and passing the expanded liquefied mixture stream to the fractionation step.

5. The method as described in claim 4, in which the liquefaction step is accomplished by heat interchanging the gaseous mixture from the first pressure reduction step against boiling liquid product in the fractionation step.

6. Apparatus for fractionating compressed and refrigerated gaseous mixtures comprising a controllable expansion valve means for reducing the pressure of a stream of the compressed and refrigerated gaseous mixture, a high pressure fractionating column, a low pressure fractionating column, means for dividing the expanded stream into a pair of substreams, conduit means for conducting one substream of the stream of the expanded mixture to the high pressure fractionating column as feed, means associated with the high pressure fractionating column for separating the feed into a liquid product and a vapor product, means for condensing the vapor product to form a liquefied product, second conduit means for conducting the liquid product of the high pressure fractionating column to the low pressure fractionating column as feed, third conduit means for conducting the liquefied product from the condensing means to the low pressure fractionating column as reflux, conduit means for conducting the other substream of the stream of expanded mixture to the low pressure fractionating column as feed, and a fixed orifice interposed in each of the second, third and fourth conduit means, the orifice in each conduit means constituting the sole means for controlling the rate of liquid flow therethrough at any constant pressure differential between the columns and the orifices in the second and third conduit means being balanced against the orifice in the fourth conduit means to proportion the stream of expanded mixture between the pair of substreams.

7. Apparatus as claimed in claim 6 in which each orifice is in elongated tubular form and of relatively small bore.

8. The method of separating a gaseous mixture in a fractionating operation including a high pressure fractionating zone and a low pressure fractionating zone, comprising the steps of expanding by means of a controllable expansion valve a stream of gaseous mixture to be fractionated, the stream of gaseous mixture being expanded to the pressure of the high pressure fractionating zone, dividing the expanded stream into a pair of substreams, introducing one of the substreams into the high pressure fractionating zone in which a preliminary fractionation takes place producing a liquid fraction and a gaseous fraction, liquefying a stream of gaseous fraction, expanding the streams of liquefied gaseous fraction and liquid fraction and the other substream of expanded gaseous mixture to the pressure of the low pressure fractionating zone, introducing a stream of expanded liquefied gaseous fraction into the low pressure fractionating zone as reflux, introducing a stream of expanded liquid fraction into the low pressure fractionating zone as feed, introducing the expanded other substream of the stream of expanded gaseous mixture into the low pressure fractionating zone as feed, and balancing the rate of flow of the liquefied gaseous fraction and the liquid fraction streams introduced into the low pressure fractionating zone against the rate of flow of the other substream of expanded gaseous mixture introduced into the low pressure fractionating zone to proportion the stream of expanded gaseous mixture between the pair of substreams.

9. The method of separating a gaseous mixture in a fractionating operation including a high pressure fractionating zone and a low pressure fractionating zone, comprising the steps of expanding without liquefaction by means of a controllable expansion valve a stream of gaseous mixture to be fractionated, the stream of gaseous mixture being expanded to the pressure of the high pressure fractionating zone, dividing the expanded stream into a pair of substreams, introducing without a further expansion step one of the substreams into the high pressure fractionating zone in which a preliminary fractionation takes place producing a liquid fraction and a gaseous fraction, liquefying a stream of the gaseous fraction, introducing a stream of liquefied gaseous fraction into the low pressure fractionating zone as reflux, introducing a stream of liquid fraction into the low pressure fractionating zone as feed, introducing the other substream of the expanded gaseous mixture into the low pressure fractionating zone as feed, expanding the streams of liquefied gaseous fraction and liquid fraction and the other substream of expanded gaseous mixture to the pressure of the low pressure fractionating zone before introduction into the low pressure fractionating zone, and balancing the rate of flow of the liquefied gaseous fraction and the liquid fraction streams introduced into the low pressure fractionating zone against the rate of flow of the other substream of expanded gaseous mixture introduced into the low pressure fractionating zone to proportion the stream of expanded gaseous mixture between the pair of substreams.

10. The method of separating a gaseous mixture in a fractionating operation including a high pressure fractionating zone and a low pressure fractionating zone, comprising the steps of expanding by means of a controllable expansion valve a stream of gaseous mixture to be fractionated, the stream of gaseous mixture being expanded to the pressure of the high pressure fractionating zone, dividing the expanded stream into a pair of substreams, introducing one of the substreams into the high pressure fractionating zone in which a preliminary fractionation takes place producing a liquid fraction and a gaseous fraction, liquefying a stream of gaseous fraction, introducing through conduit means a stream of liquefied gaseous fraction expanded to the pressure of the low pressure fractionating zone into the low pressure fractionating zone as reflux, introducing through conduit means a stream of liquid fraction expanded to the pressure of the low pressure fractionating zone into the low pressure fractionating zone as feed, introducing through conduit means the other substream of the expanded gaseous mixture expanded to the pressure of the low pressure fractionating zone into the low pressure fractionating zone as feed, establishing fixed pressure drops of the streams of fluid passing through the conduit means and balancing the pressure drop of the stream of liquefied gaseous fraction and the stream of liquid fraction against the pressure drop of the other substream of the expanded gaseous mixture to proportion the stream of expanded gaseous mixture between the pair of substreams.

11. Apparatus for fractionating compressed and refrigerated gaseous mixtures comprising a controllable expansion valve means for reducing without liquefaction the pressure of a stream of the compressed and refrigerated gaseous mixture, a high pressure fractionating column, a low pressure fractionating column, means for dividing the expanded stream into a pair of substreams, first conduit means for conducting without further expansion one substream of the expanded mixture to the high pressure fractionating column as feed, means associated with the high pressure fractionating column for separating the feed into a liquid fraction and a vapor fraction, means for condensing a stream of vapor fraction from the high pressure fractionating column to form a stream of liquefied fraction, second conduit means for conducting a stream of liquid fraction from the high pressure fractionating column to the low pressure fractionating column as feed, third conduit means for conducting a stream of liquefied fraction to the low pressure fractionating column as reflux, fourth conduit means for conducting the other substream of the stream of expanded mixture to the low pressure fractionating column as feed, and a fixed orifice interposed in each of the second, third and fourth conduit means, the orifice in each conduit means constituting the sole means for controlling the rate of liquid flow therethrough at any predetermined pressure differential between the columns, and the orifices in the second and third conduit means being balanced against the orifice in the fourth conduit means to proportion the expanded stream of gaseous mixture between the pair of substreams.

References Cited in the file of this patent

UNITED STATES PATENTS

| | | |
|---|---|---|
| 1,917,891 | Levin | July 11, 1933 |
| 1,968,518 | Fraser | July 31, 1934 |
| 2,048,076 | Linde | July 21, 1936 |
| 2,209,748 | Schlitt | July 30, 1940 |
| 2,287,137 | Ross | June 23, 1942 |
| 2,386,297 | Dennis | Oct. 9, 1945 |
| 2,409,458 | Van Nuys | Oct. 15, 1946 |
| 2,431,866 | Dennis | Dec. 2, 1947 |
| 2,433,508 | Dennis | Dec. 30, 1947 |
| 2,433,536 | Van Nuys | Dec. 30, 1947 |
| 2,448,491 | Latham | Aug. 31, 1948 |